United States Patent [19]
Heinicke

[11] 3,967,183
[45] June 29, 1976

[54] SELF-COMMUTATING INVERTER WITH CONTROLLED MAIN VALVES IN A CENTER-TAP CIRCUIT

[75] Inventor: Harald Heinicke, Erlangen, Germany

[73] Assignee: Siemens Aktiengesellschaft, Munich, Germany

[22] Filed: Nov. 29, 1974

[21] Appl. No.: 528,487

[30] Foreign Application Priority Data
Dec. 4, 1973   Germany............................ 2360426

[52] U.S. Cl. ........................ 321/45 C; 307/252 M
[51] Int. Cl.².......................................... H02M 7/515
[58] Field of Search .......... 307/252 M, 241, 247 R, 307/256; 321/36, 45 C

[56]   References Cited
   UNITED STATES PATENTS

| | | | |
|---|---|---|---|
| 1,929,720 | 10/1933 | Willis | 321/36 |
| 3,082,369 | 3/1963 | Landis | 321/45 R |
| 3,207,974 | 9/1965 | McMurray | 321/45 C |
| 3,348,131 | 10/1967 | Banks | 321/45 DT |
| 3,418,558 | 12/1968 | Morgan et al. | 321/45 C |
| 3,426,969 | 2/1969 | Anderson, Jr. | 307/247 R X |
| 3,551,827 | 12/1970 | Stopper | 37/247 X |
| 3,588,670 | 6/1971 | King | 321/45 C |
| 3,686,515 | 8/1972 | Kadono | 307/247 X |

*Primary Examiner*—William M. Shoop
*Attorney, Agent, or Firm*—Keyon & Kenyon Reilly Carr & Chapin

[57]   ABSTRACT

The invention concerns a self-commutating inverter with controlled main valves in a center-tap circuit, with which a commutation capacitor, a series choke and a recovery valve each are associated, and with a transformer for connecting a variable load. In order to reduce the no-load losses, the two series diodes which are customarily connected in series with the main valves, are omitted. Provision is made instead for connecting in series with the commutation capacitor an electronic switching member which can be switched-on together with the main valves.

2 Claims, 2 Drawing Figures

SELF-COMMUTATING INVERTER WITH CONTROLLED MAIN VALVES IN A CENTER-TAP CIRCUIT

BACKGROUND OF THE INVENTION

1. Field of the Invention

The invention concerns a self-commutating inverter with controlled main valves in a center-tap circuit, with which a commutation capacitor, a series choke and a recovery valve each are associated, and with a transformer for connecting a variable load.

2. Description of the Prior Art

Such an inverter (see, for instance, the Siemens text book Thyristor Handbuch (Thyristor Handbook) by A. Hoffman and K. Stocker, 1965, Berlin and Erlangen, pages 243 to 250, particularly FIG. 165 on page 248) can be supplied, for instance, from a battery or from a rectifier with controlled or uncontrolled valves. It delivers at the secondary winding of its transformer a rectangular or trapezoidal a-c voltage the amplitude of which is determined by the magnitude of the input d-c voltage and the frequency of which is determined by the firing frequency of the main valves. In such an inverter, the recovery valves may be connected on the cathode side to the two ends of the primary winding of the transformer. In deviation therefrom, it has become customary to provide the primary winding with taps in the vicinity of its two ends and to connect the recovery valves there. In order to prevent the commutation capacitor from partially discharging prematurely by way of the primary winding of the transformer, the inverter is further supplemented by two series diodes which are connected in series with each of the main valves. Arranging these series diodes is absolutely necessary if the load is subject to variations during the operation of the inverter. Also in the event of variations of the input d-c voltage, the series diodes prevent the commutation capacitor from discharging prematurely, so that also in this case reliable commutation from one main valve to the other is assured. Such an inverter can also be supplemented to form a bridge circuit (see the literature reference mentioned, "Thyristor Handbuch", particularly FIG. 167 on page 250).

In an inverter with a center-tap circuit, there must flow through a series choke, in order to avoid voltage dips, i.e., deviations from the desired rectangular or trapezoidal shape of the output voltage, a circulating current which, considering the transformation ratio of the tansformer, corresponds to at least the magnitude of the maximum load current to be expected. This circulating current is determined not only by the voltage at the transformer taps that may be provided, but additionally also by the line resistances and the path resistances of the valves in the circuit in question.

Assuming that the tap voltages at the transformer, which cause a reversal of the magnetization of the series choke, and their effective times are larger than the voltage and the charge reversal time of the commutation capacitor, no continuously flowing circulating current will develop. The ensuing circulating current will have gaps.

If, however, the tap voltages at the transformer are made smaller, a non-gapping circulating current will always develop. The latter produces at the line resistances and at the path resistances of the valves an additional counter-voltage for the series choke, so that an equilibrium state between forward magnetization and reverse magnetization is brought about. If the inverter is idling, i.e., if the inverter, for instance, has no load connected to it, the continuously flowing circulating current will generate relatively high losses. In general, these idling losses are tolerated, as an inverter with continuously flowing circulating current has the advantage that a suddenly added load or a load jump does not cause a break in the output voltage. Particularly in an inverter of high operational power rating, the trend is, however, to keep these idling losses caused by the circulating current to a minimum. In switching systems, in which the idle condition of the inverter corresponds to a ready-reserve position, e.g., in ready-standby installations, the operating costs can be reduced by a reduction of the idling losses.

It is an object of the invention to reduce the losses of the inverter mentioned at the outset, which is basically designed for operationally varying loads, to increase the efficiency thereby and to lower the cost of operation.

SUMMARY OF THE INVENTION

According to the invention, this problem is solved by connecting in series with the commutation capacitor an electronic switching member which can always be switched on together with the main valves, its "on" time being no longer than the charge-reversal time of the commutation capacitor.

In this inverter, the series diodes can be completely dispensed with, which according to the present state of the art are absolutely necessary in inverters with controlled main valves in a center-tap circuit to maintain the capacitor charge in the case of varying load and/or input d-c voltage. Their function is taken over by the switching member which is always switched-on with the main valves. In this manner, the path losses in the two series diodes are completely eliminated. Because of the absence of the series diodes and the path resistance, the ohmic resistance is therefore appreciably reduced in the two circuits in which the circulating current flows. The electric energy which is saved by omitting the two series diodes, is considerably larger than the energy that is lost by adding the electronic switching member. Considering the energy balance, it is therefore found that overall, energy is saved by the measures stated. The reason for this is mainly that the current-time area acting on the electronic switching member per period is smaller overall than the two current-time area which would act on the two series diodes per period, if they were there. The inverter according to the invention thus requires less power in the idling as well as in the loaded operating condition. Because of the absence of the series diodes, the space required is less. One can further save the heat sinks otherwise required for the series diodes, which again reduces the space required and lowers the manufacturing costs.

As the electronic switching member, which must be capable of carrying current in both directions, a Triac in particular, may be provided. However, it is also possible to provide instead as the electronic switching member another two-way valve, namely, an antiparallel connection of controlled semiconductor valves, of which one can be switched on with one main valve and the other, with the other main valve. In this case, thyristors (SCR's) or also transistors can be used as semiconductor valves. These semiconductor valves need be laid out only for less switching power than the main valves.

One will, in particular, proceed in such a manner that the switching-on signals for the electronic switching member are derived from the firing pulses for the main valves of the inverter. In this manner, a separate control unit can be saved. In this connection it is particularly advantageous if the control electrode of the electronic switching member is connected with the control lines of the main valves by way of a potential separating OR circuit. Then, the switching member receives in each period of the output voltage two switch-on signals, the start of which coincides with the respective beginning of the firing pulses for the main valves. For the purpose of potential separation, the OR circuit may contain at least one transformer. To avoid a reaction between the control lines of the main valves, the potential-separating OR circuit should contain at least one blocking diode.

Care must be taken that the duration of the switch-on signals is substantially shorter than the half-period of the fundamental of the output voltage. So that this condition is observed also for firing pulses for the main valves whose duration is approximately equal to the half-period, it is advisable to arrange a differentiating member between the control electrode of the electronic switching member and the potential-separating OR circuit.

DESCRIPTION OF THE INVENTION

Figure 1:
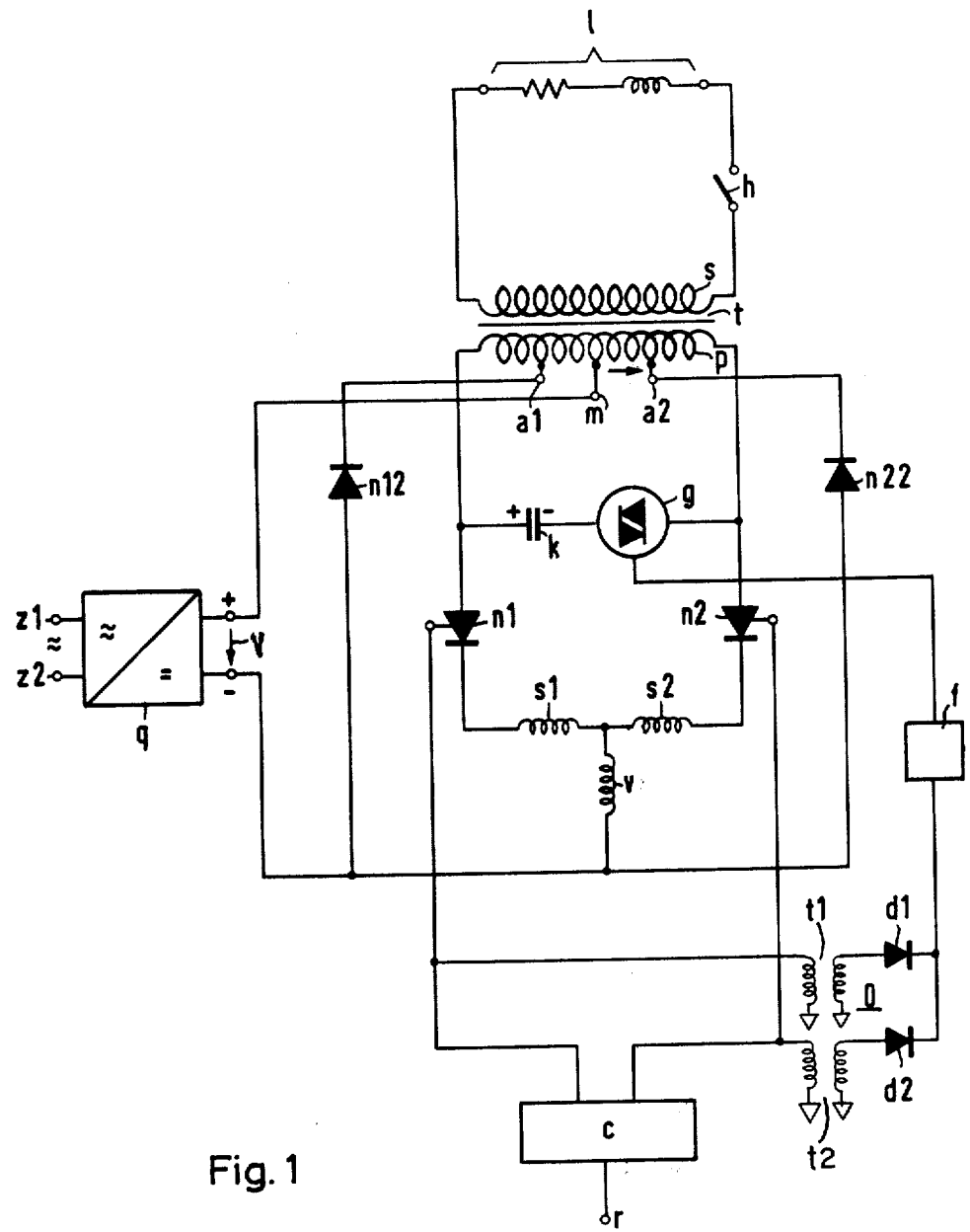
FIG. 1 shows a controlled inverter, which can be used, for instance, in an immediate-readiness standby installation having a high output power rating, say, 120 kVA.

FIG. 1 shows the center tap $m$ of the primary winding $p$ of a transformer $t$ connected to the positive pole of a d-c voltage source $q$. The output voltage V of this d-c voltage source $q$ may be, for instance, 220 V. In the present case, a rectifier whose input terminals $z1$ and $z2$ can be connected to an a-c voltage source, e.g., an a-c system, is provided as the d-c voltage source. The rectifier may contain, for instance, controlled or uncontrolled valves in a bridge circuit. Instead of a rectifier, a battery or a fuel cell may also be provided as the d-c voltage source $q$. Generally speaking, the d-c voltage source $q$ may have appreciable internal resistance.

The one end of the primary winding $p$ is connected with the negative terminal of the d-c voltage source $q$ by way of a first controlled main valve $n1$, a first commutation choke $s1$ and a series choke $v$. The other end of the primary winding $p$ is connected likewise with the negative terminal of the d-c voltage source $q$ by way of a second controlled main valve $n2$, a second commutation choke $s2$ and the series choke $v$. The main valves $n1$ and $n2$, which may preferably be thyristors (SCR's), are fired, for operation into a load, alternatingly by means of control lines connected to a trigger generator $c$. The trigger frequency is, for instance, 100 pulses per second. This trigger generator $c$ is in turn addressed by a control signal $r$, which may be furnished, for instance, by a controller (not shown) which is provided for the frequency control of the output voltage.

To supply the commutation current for the controlled main valves $n1$, $n2$, a commutation capacitor $k$ is provided which is connected in series with an electronic switching member $g$. The series circuit consisting of the commutation capacitor $k$ and the switching member $g$ connects the anodes of the two main valves $n1$ and $n2$.

A load 1 with an inductive and an ohmic impedance component can be connected to the secondary winding $s$ of the transformer $t$ by means of a switch $h$. As the load, 1$a$ data processing installation may be provided which in normal operation is supplied by another current source, not shown. If this other current source fails, the inverter in no-load condition can be connected by means of the switch $h$, so that a load discontinuity results at the output of the former. The inverter is in this case part of a rapid-response standby system. However, another consumer may also be provided as the load 1, which in operation (with the switch $h$ closed) is subjected to fluctuations, which in some cases may occur as jumps. The inverter is constructed so that such load variations at its output have no influence on the shape of the output voltage, or only insignificantly so.

To limit overvoltages in the flow direction of the current of the controlled main valves $n1$, $n2$, which can be caused by the inductive component of the load 1 and the series choke $v$, two uncontrolled bypass or recovery valves $n12$ and $n22$ are provided. The cathode of the recovery valve $n12$ is connected to a tap $a1$, which is situated at the one end of the primary winding $p$. Similarly, the cathode of the other recovery valve $n22$ is connected to a tap $a2$, which is situated at the other end of the primary winding $p$. The anodes of both recovery valves $n12$ and $n22$ are connected with the negative terminal of the d-c voltage source $q$.

In the open-circuit operation of the inverter, a considerable circulating current flows here alternatingly via the elements $n1$, $s1$, $v$, $n12$, $a1$ and $p$ as well as $n2$, $s2$, $v$, $n22$, $a2$ and $p$. The magnitude of these circulating currents is set by the choice of the taps $a1$, $a2$ relative to the ends of the primary winding $p$. Their magnitude should be approximately equal to the peak value of the expected load current, transformer-wise referred to the primary side, so that the shape of the output voltage is preserved. They can therefore lead to considerable operating costs if the inverter is operated without load for extended periods of time. In the inverter shown, the circulating currents and therewith, the no-load losses are reduced considerably by the provision that the otherwise customary series diodes, which are otherwise disposed between each end of the primary winding $p$ and an anode of the main valves $n1$, $n2$, are omitted. Their path losses can therefore contribute nothing to the no-load losses. It is nevertheless assured by the insertion of the switching element $g$ that neither a change in the load nor a change in the input d-c voltage V can lead to a decrease of the capacitor charge. In one inverter built the reduction of the no-load losses resulting from the omission of the series diodes was about 14%.

As shown in the FIG. 1, a Triac, in particular, can be used as the electronic switching member. In its place can be used, however, also antiparallel-connected thyristors of lesser power rating than the main valves $n1$, $n2$, of which the one can be fired simultaneously with the one main valve $n1$ and the other, simultaneously with the other main valve $n2$.

The switch-on signals of the switching member $g$ are obtained via a potential-separating OR circuit O from the firing pulses for the main valves $n1$, $n2$. It is thereby assured that the switch-on signals are accurately synchronized timewise with the firing pulses. A separate control unit for the switching member g becomes thereby unnecessary.

In controlling the switching member g it is important that its switch-on signals are somewhat shorter in time than the half-period of the output voltage of the inverter. If a Triac is used as the switching member g, spikes or short pulses should therefore be used for triggering. The reason for this is seen in the fact that the inverter is in general designed so that the charge reversal time of the commutation capacitor k is short as compared to the half-period of the output voltage. The switching member should be "on" only during this brief charge reversal. The "on" time should therefore not be longer than the respective charge-reversal time of the commutation capacitor k. Disturbances occurring after the end of the switch-on signal and therefore, after the end of the charge reversal, can then no longer lead to a partial discharge of the commutation capacitor k.

The switching member g should therefore be controlled in such a manner that it is closed exactly at the firing instant of the main valves n1, n2 and is opened again after the end of the charge-reversal time of the commutation capacitor k. This charge-reversal time may be, for instance, one-fifth of the half-period. Accordingly, the "on" time of the switching member g should then also be equal to one-fifth of the half-period or, what is the same, equal to one-fifth of the current conduction time of one of the main valves n1, n2. Then, the commutation capacitor k cannot discharge subsequently if the load 1 or the input d-c voltage varies. The capacitor charge is retained undiminished until it is used, at the next firing of a main valve n1, n2, to extinguish the other main valve n1 or n2, respectively.

According to FIG. 1, the potential-separating OR circuit O contains two branches, which form the switch-on signals for the switching member g. The one branch consists of a transformer t1 and a blocking diode d1 in series. It is disposed between the control line of the first main valve n1 and the control electrode of the switching member g. The other branch consists of a further transformer t2 in series with a further blocking diode d2. This branch is disposed between the control line of the second main valve n2 and the control electrode of the switching member g. The two transformers t1 and t2 serve to separate the potentials, while the two blocking diodes d1 and d2 assure that if one main valve n1 or n2 fires, no reaction takes place via the OR circuit O on the control electrode of the other, not fired main valve n2 or n1, respectively, which could lead to unintended firing. So that only spikes or short pulses are used as the switch-on signals, a differentiating member f can further be arranged between the OR circuit O and the control electrode of the switching member. The two transformers t1 and t2 can be replaced by a single transformer (not shown), which is arranged at the input of the differentiating member f.

Regarding the operation of the inverter shown it can be said that it exhibits the same current and voltage conditions as the known inverter with main valves in a center-tap circuit and with series diodes, but that its losses in no-load and in loaded operation are considerably lower.

Figure 2:
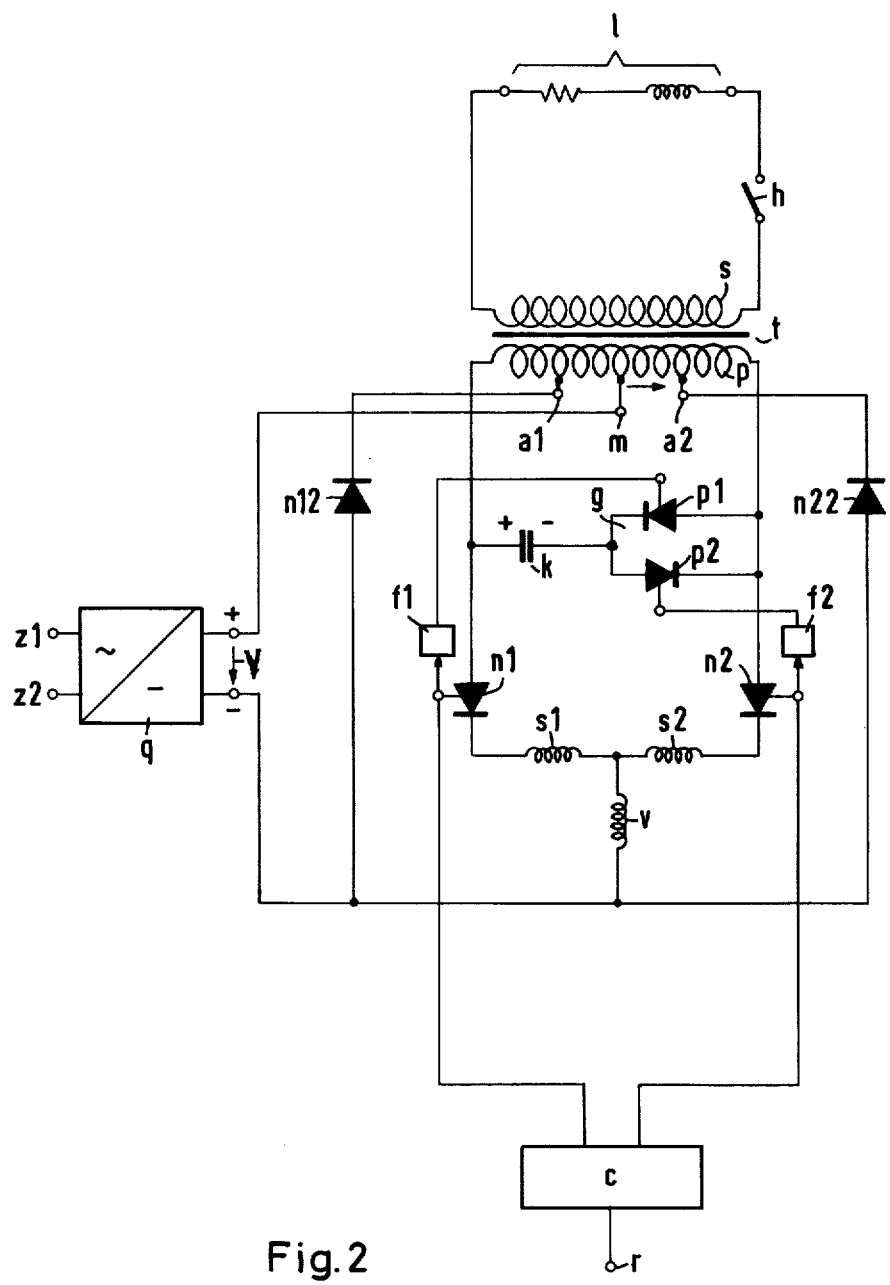
FIG. 2 shows a circuit similar to that of FIG. 1 except that anti-parallel connected controlled semi-conductor valves are used as the switching member.

In FIG. 2, a self-commutating inverter is shown, which corresponds largely to that of FIG. 1. As the electronic switching member g, which is connected in series with the commutation capacitor k, an antiparallel circuit of controlled semiconductor valves is provided. Specifically involved here are two thyristors p1 and p2, which may have a lower power rating than the main valves n1, n2. The main valves n1, n2 are again supplied with firing pulses by the trigger generator c. The one thyristor p1 can be fired together with the main valve n1 and the other thyristor p2, together with the main valve n2. To this end, the control electrode of the main valve n1 is connected with the control electrode of the thyristor p1 via a differentiating member f1. Similarly, also the control electrode of the main valve n2 is connected with the control electrode of the thyristor p2 via a differentiating member f2. In FIG. 2, it is again important that series diodes in series with the main valves n1, n2 are not necessary.

What is claimed is:
1. In a self commutating inverter circuit comprising, an output transformer, the primary windings of which have a center tap connected to the positive terminal of a source of d-c voltage, the output windings of which are connected to a variable load, two main valves, the anode of each one connected respectively to the ends of said primary winding, the cathode of each connected to the negative terminal of said source of d-c voltage through a series choke inductor, two recovery diodes, the cathode of each one connected respectively to taps on either side of said center tap between said center tap and said ends of said primary winding, the anode of each one connected to said negative terminal of said source of d-c voltage, a series connected commutation capacitor and bidirectional electronic switching member, having a control electrode connected between the anodes of said main valves, and means for generating firing impulses for said main valves, the improvement comprising:

first and second potential separating transformers each having a primary winding and a secondary winding, the primaries of said first and second transformers coupled respectively to the outputs of said means generating firing impulses for said two main valves;

differentiating means having its output coupled to said control electrode of said bidirectional electronic switching means, an OR gate made up of two blocking diode having its two inputs coupled respectively to the secondaries of said first and second transformers and its output coupled as an input to said differentiating means.

2. The inverter circuit of claim 1 wherein a triac is provided as the electronic switching member.

* * * * *